July 16, 1929. M. B. CLAFF ET AL 1,721,431
BOX MAKING MACHINE
Filed May 26, 1926 12 Sheets-Sheet 2
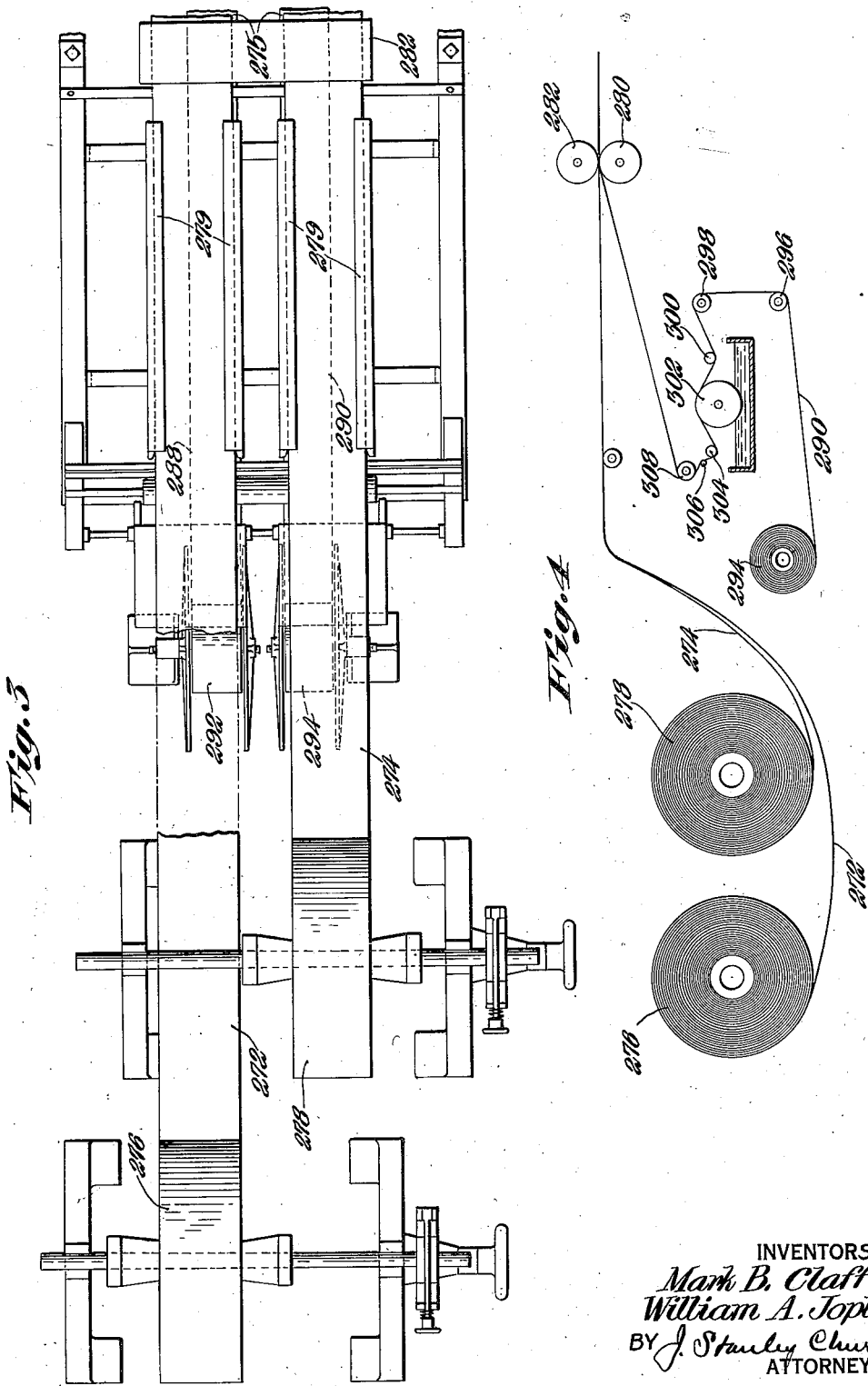
INVENTORS
Mark B. Claff
William A. Joplin
BY J. Stanley Churchill
ATTORNEY

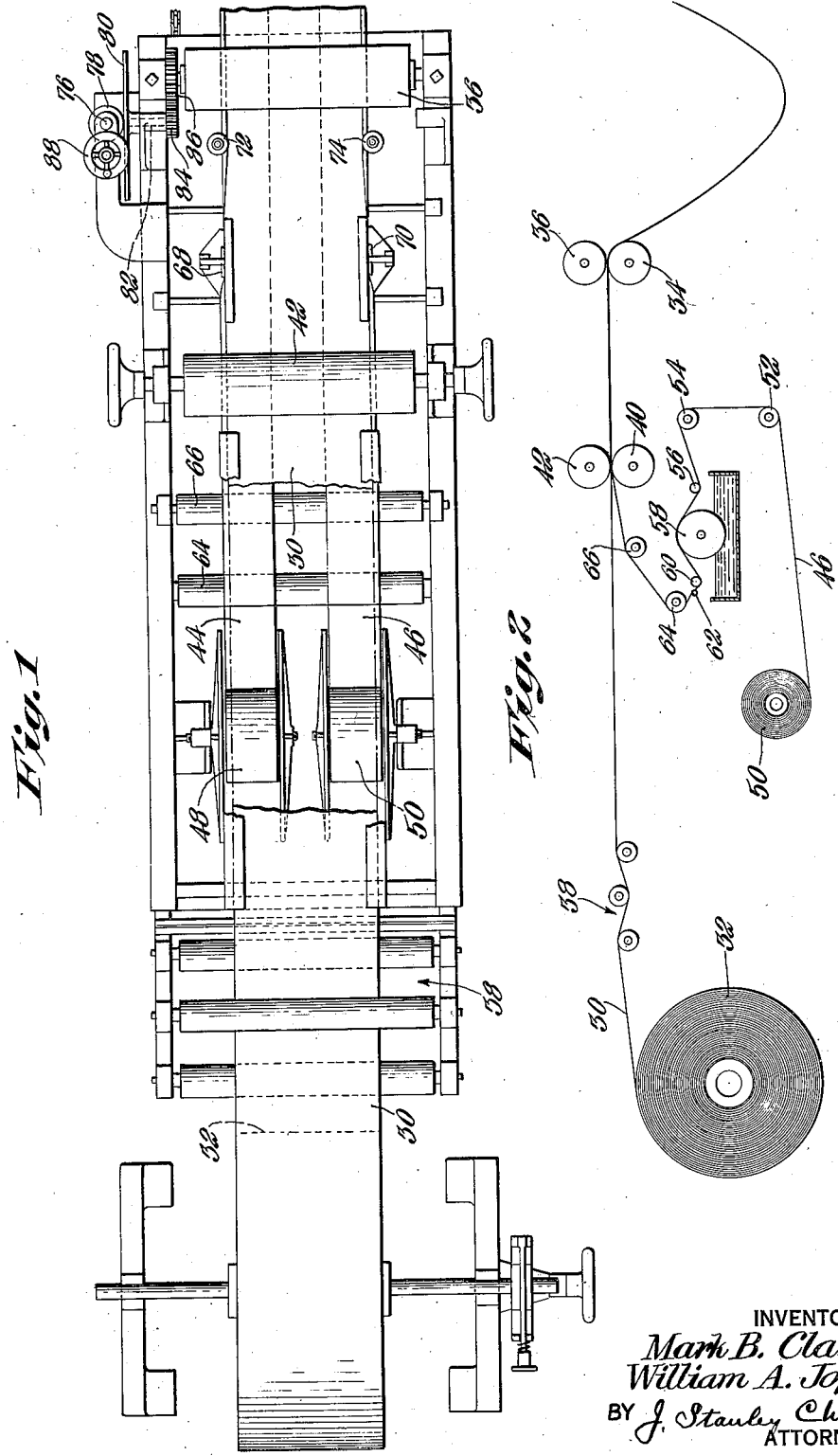

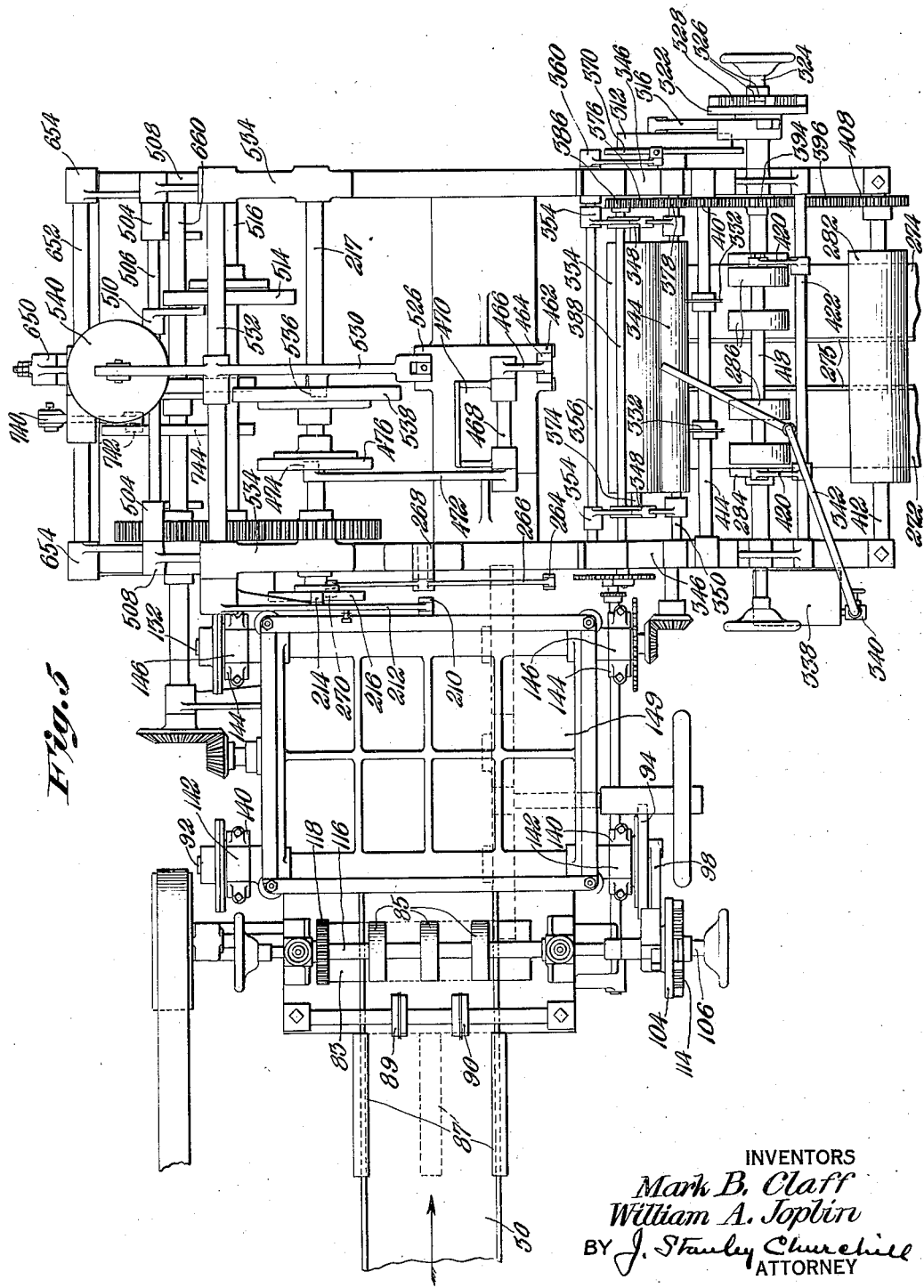

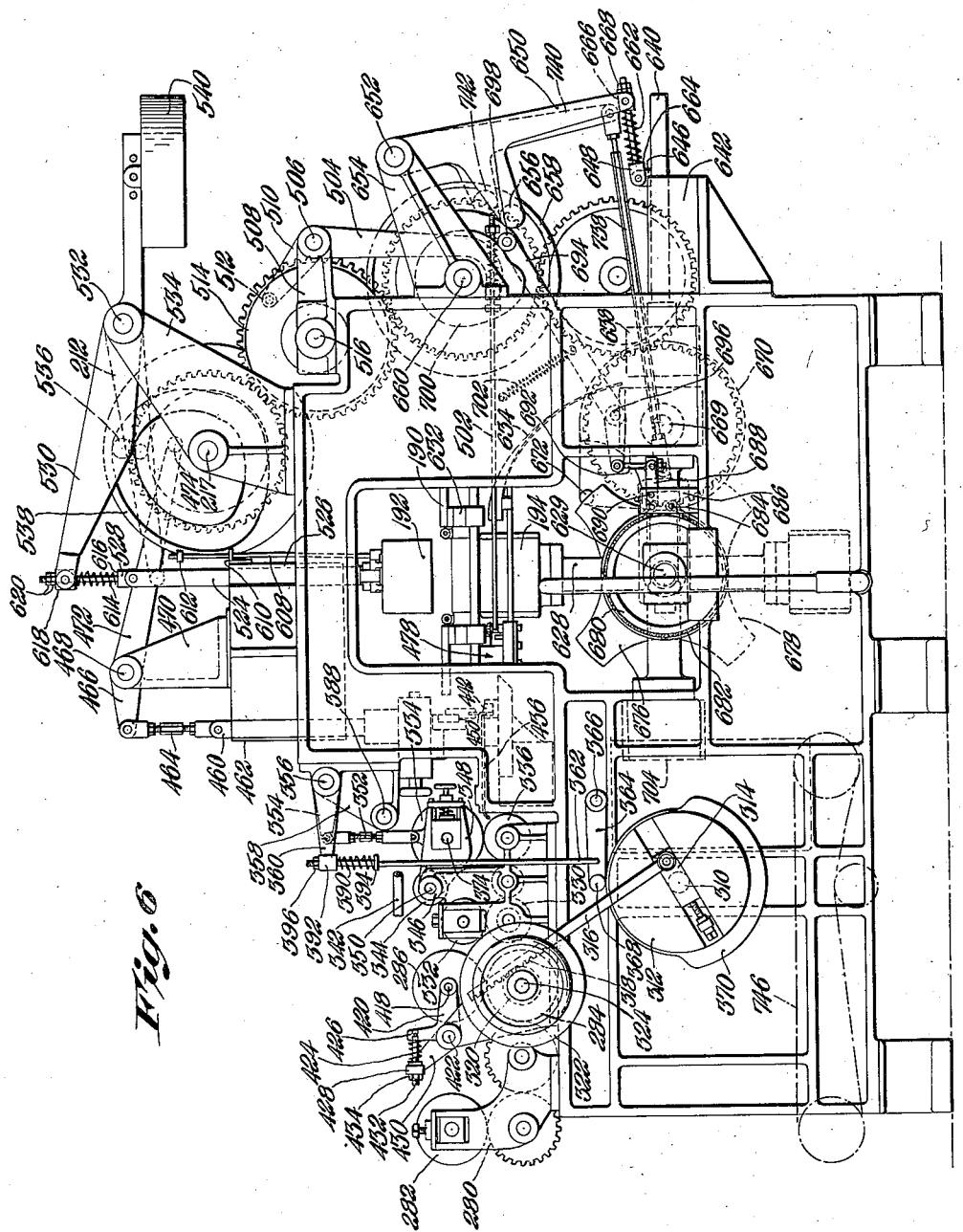

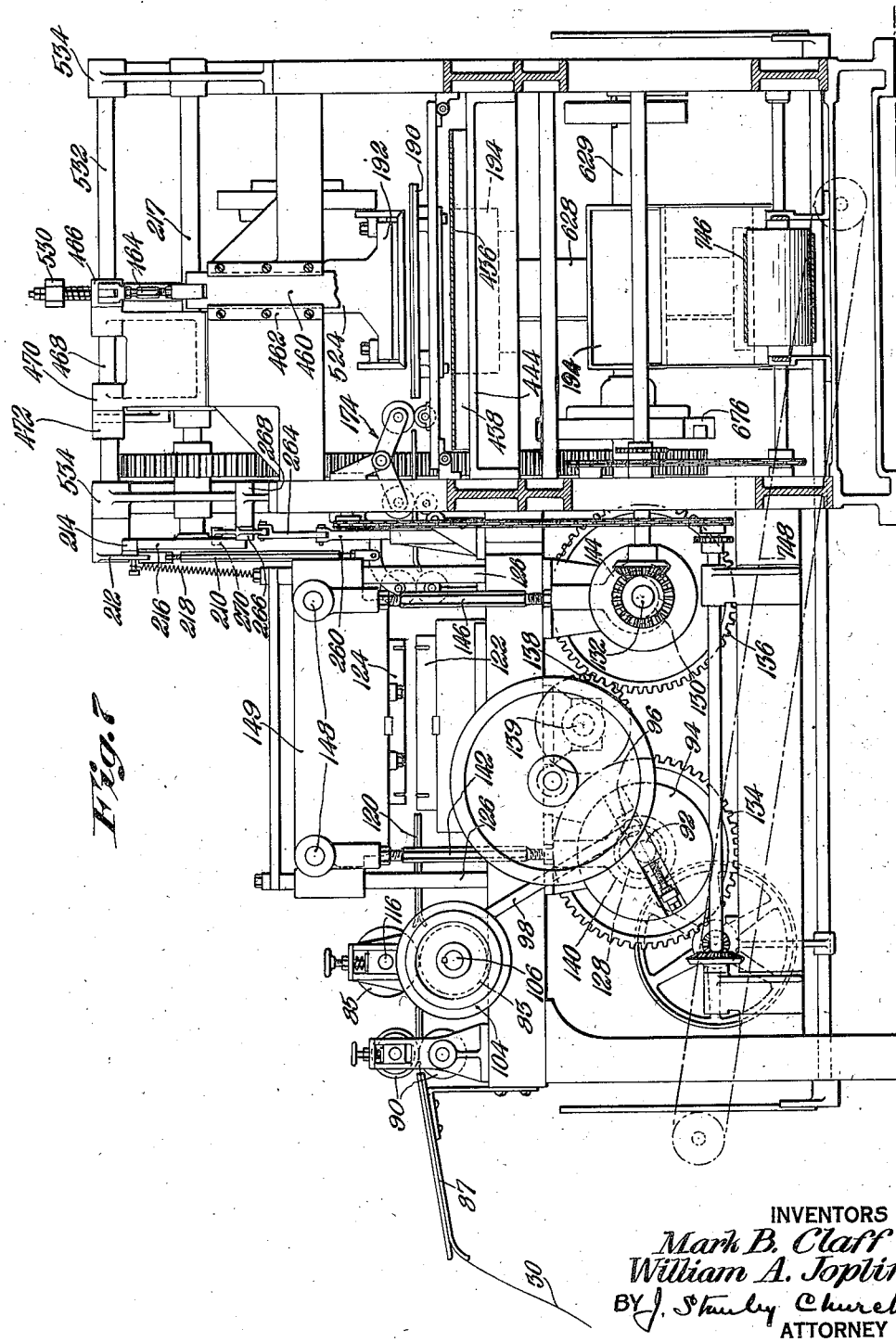

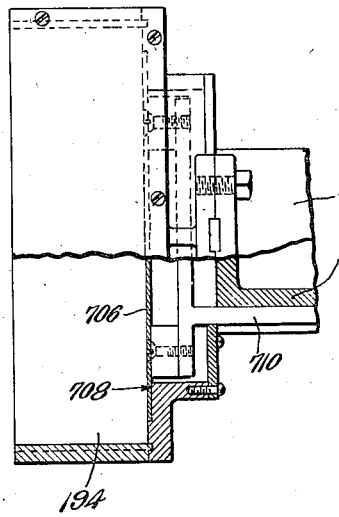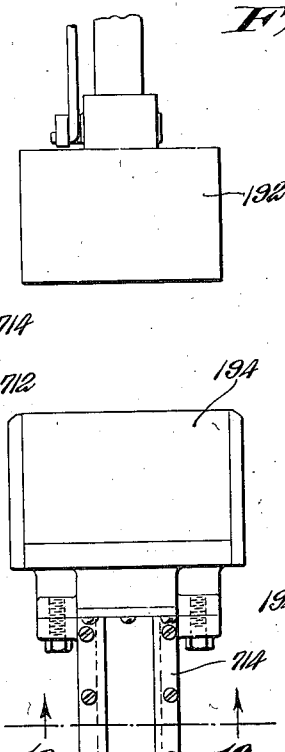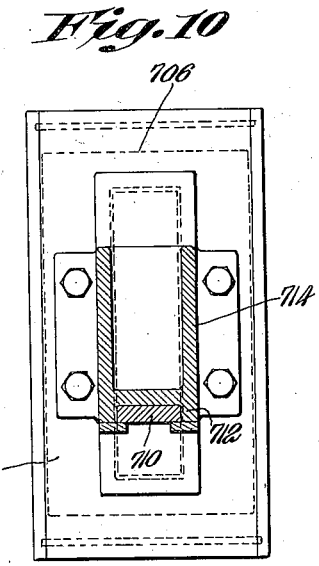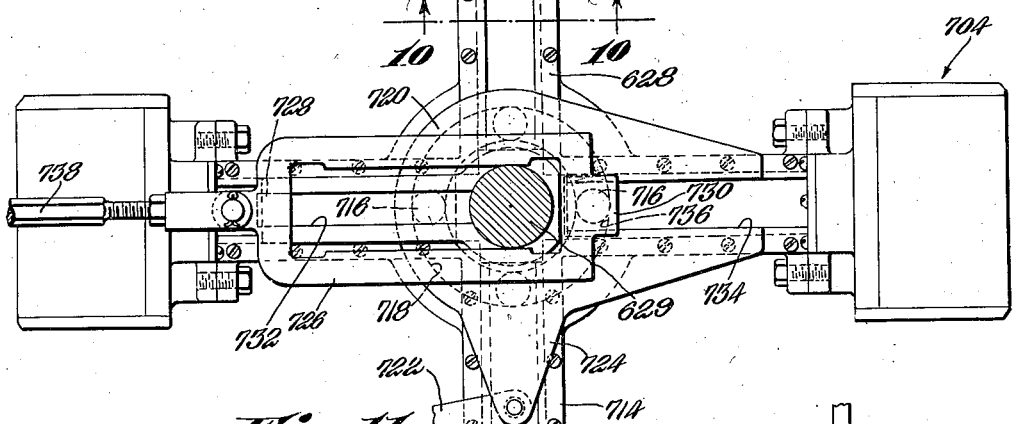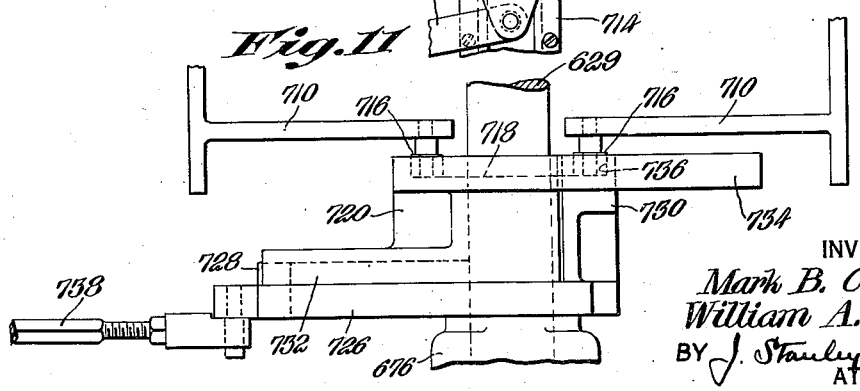

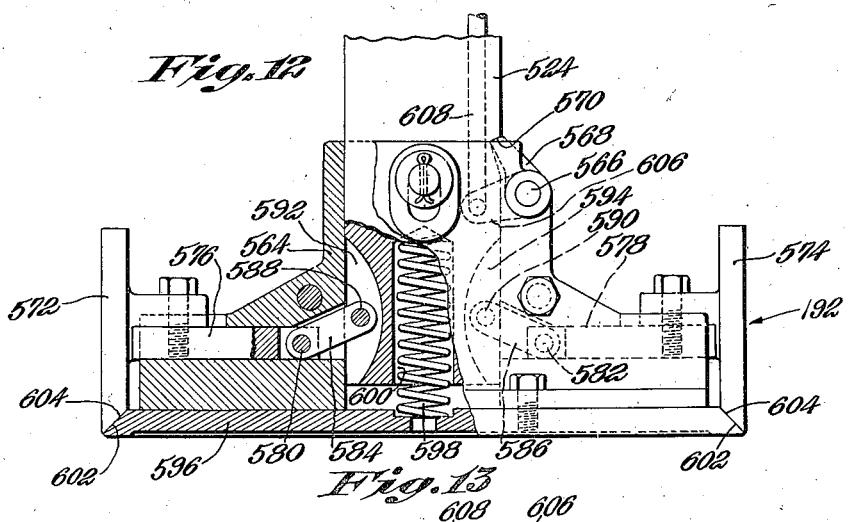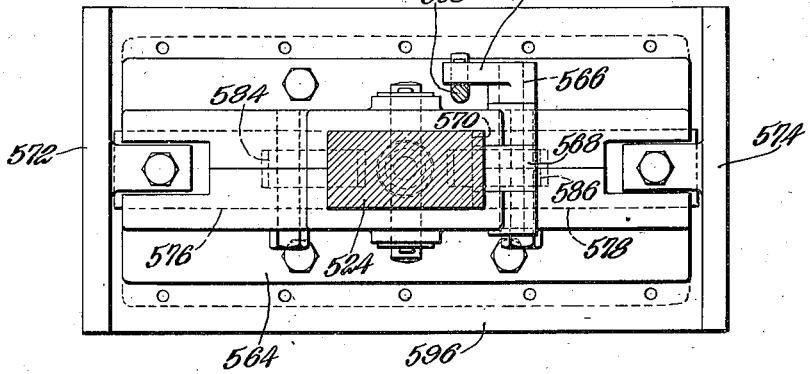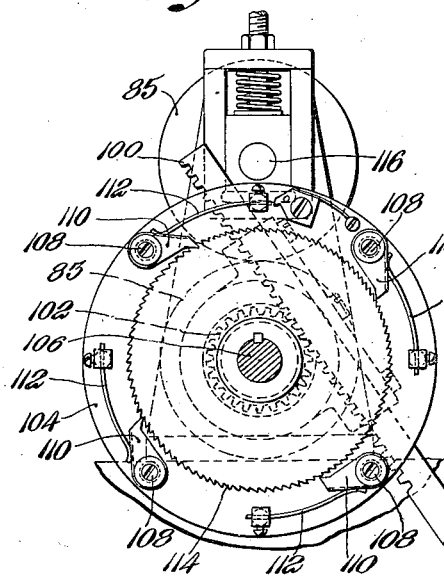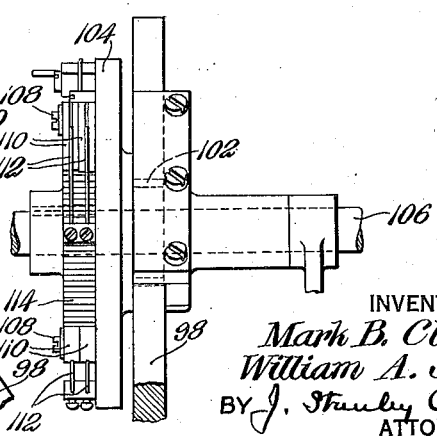

INVENTORS
Mark B. Claff
William A. Joplin
BY J. Stanley Churchill
ATTORNEY

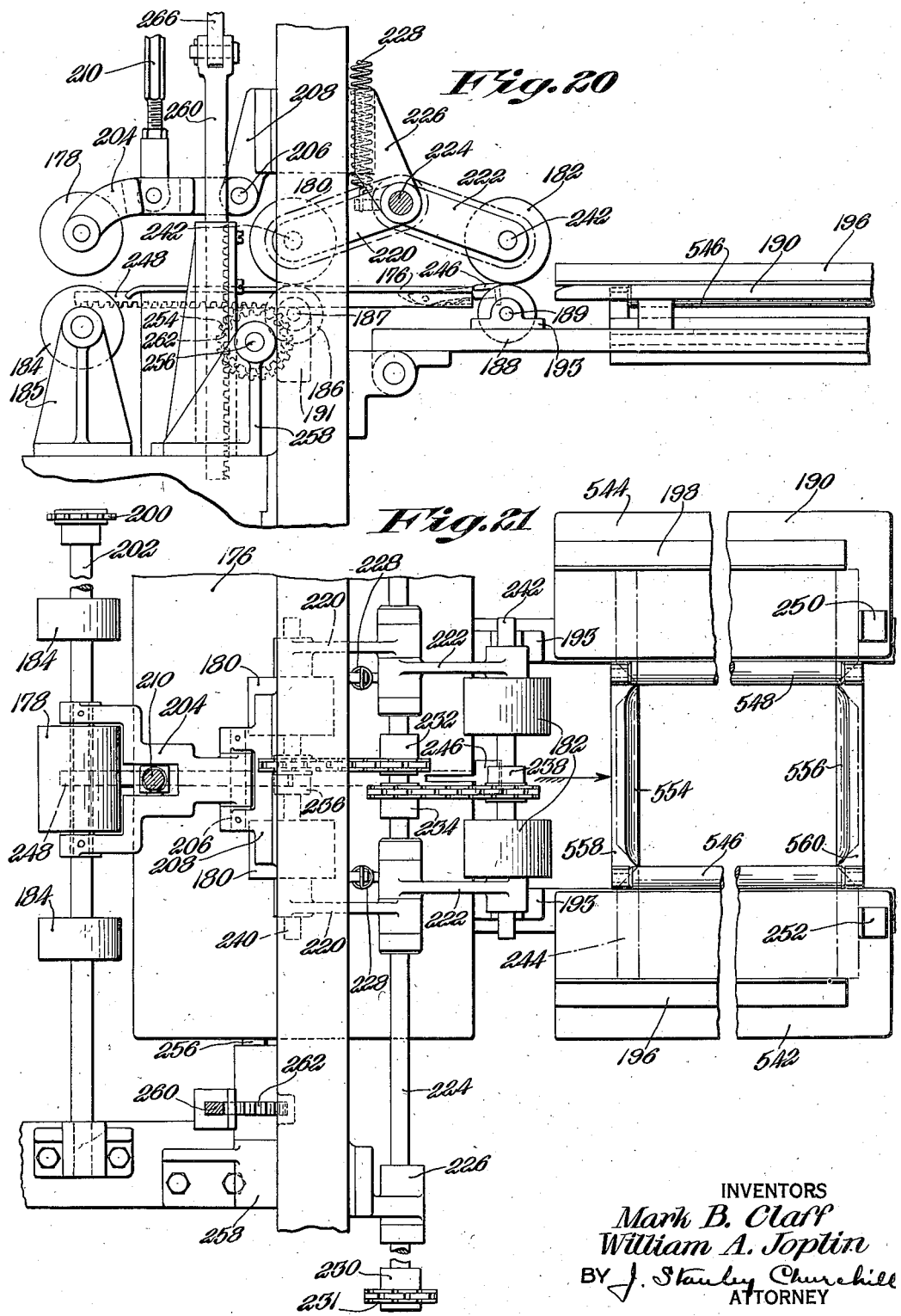

July 16, 1929.  M. B. CLAFF ET AL  1,721,431
BOX MAKING MACHINE
Filed May 26, 1926   12 Sheets-Sheet 11
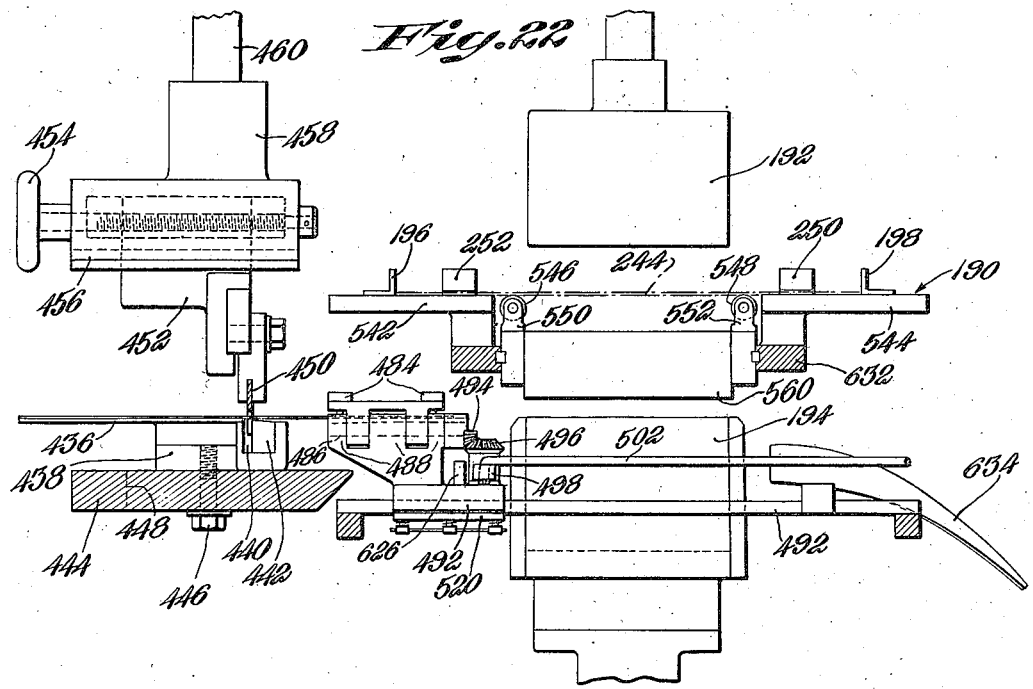
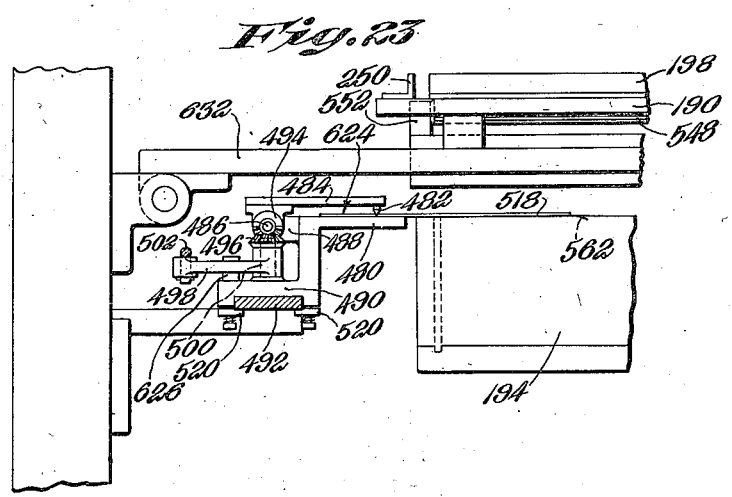
INVENTORS
Mark B. Claff
William A. Joplin
BY J. Stanley Churchill
ATTORNEY

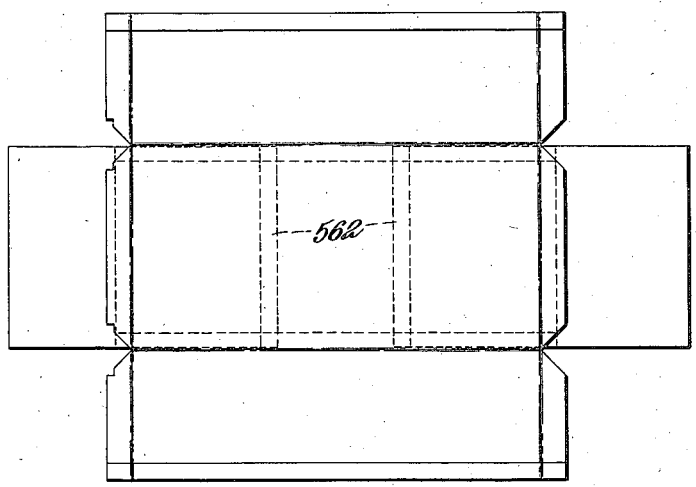
Fig. 24.
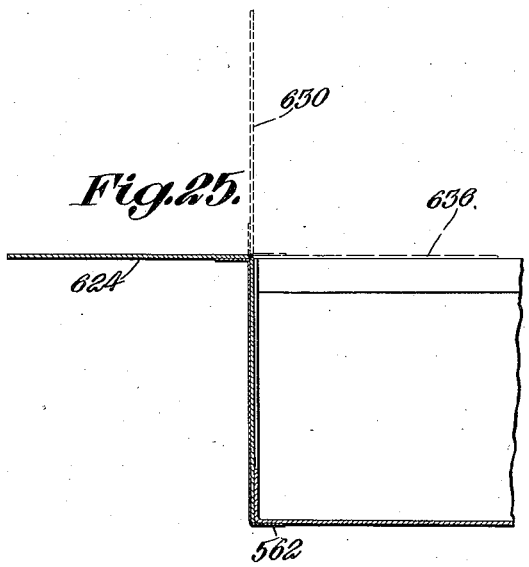
Fig. 25.
Fig. 26.
Fig. 27.
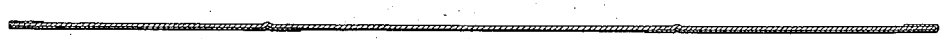
Fig. 28.

Patented July 16, 1929.

1,721,431

UNITED STATES PATENT OFFICE.

MARK B. CLAFF, OF RANDOLPH, AND WILLIAM A. JOPLIN, OF NORFOLK DOWNS, MASSACHUSETTS; C. LLOYD CLAFF ADMINISTRATOR OF SAID MARK B. CLAFF, DECEASED.

BOX-MAKING MACHINE.

Application filed May 26, 1926. Serial No. 111,876.

This invention relates to a box making machine.

One object of the invention is to provide a box making machine of novel construction for producing paper boxes rapidly and at a minimum expense.

A further object of the invention is to provide an automatic machine for the economical production of the paper boxes forming the subject matter of the U. S. Patent to M. B. Claff No. 1,579,646, April 6, 1926.

With these objects in view and such other objects as may hereinafter appear, the invention consists in the box making machine and in the structures, combinations and arrangements of parts hereinafter described and particularly defined in the claims at the end of this specification.

Figure 16:
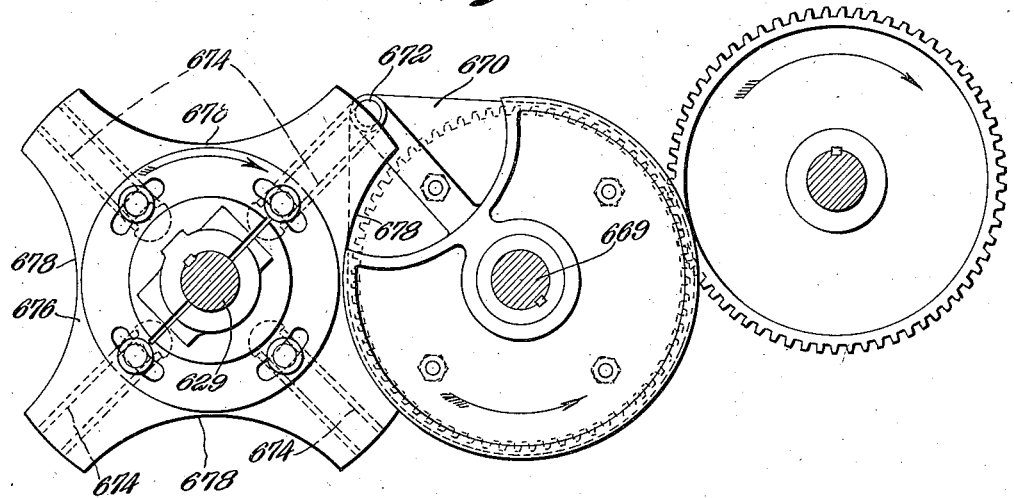
Figure 17:
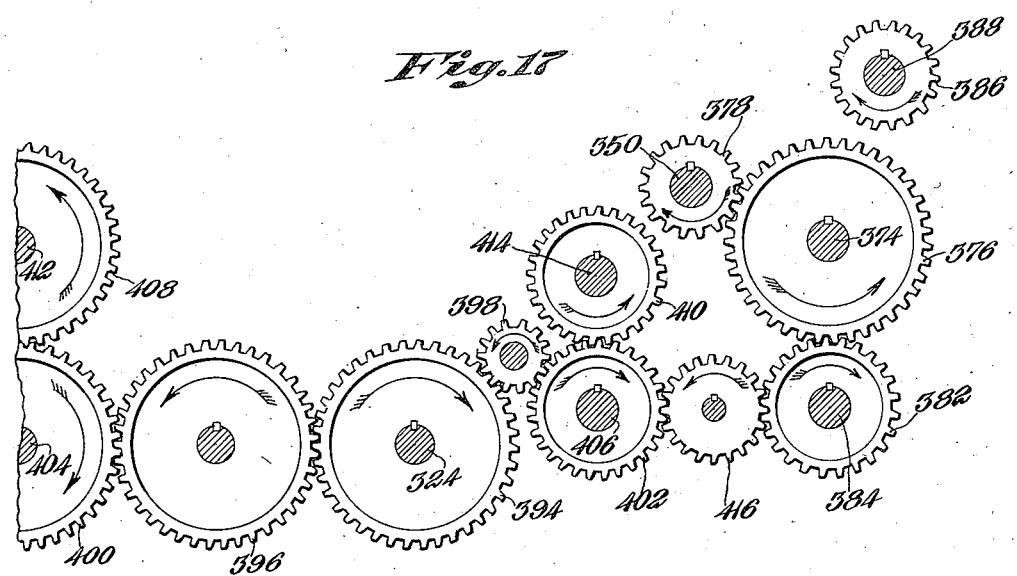
Figure 18:
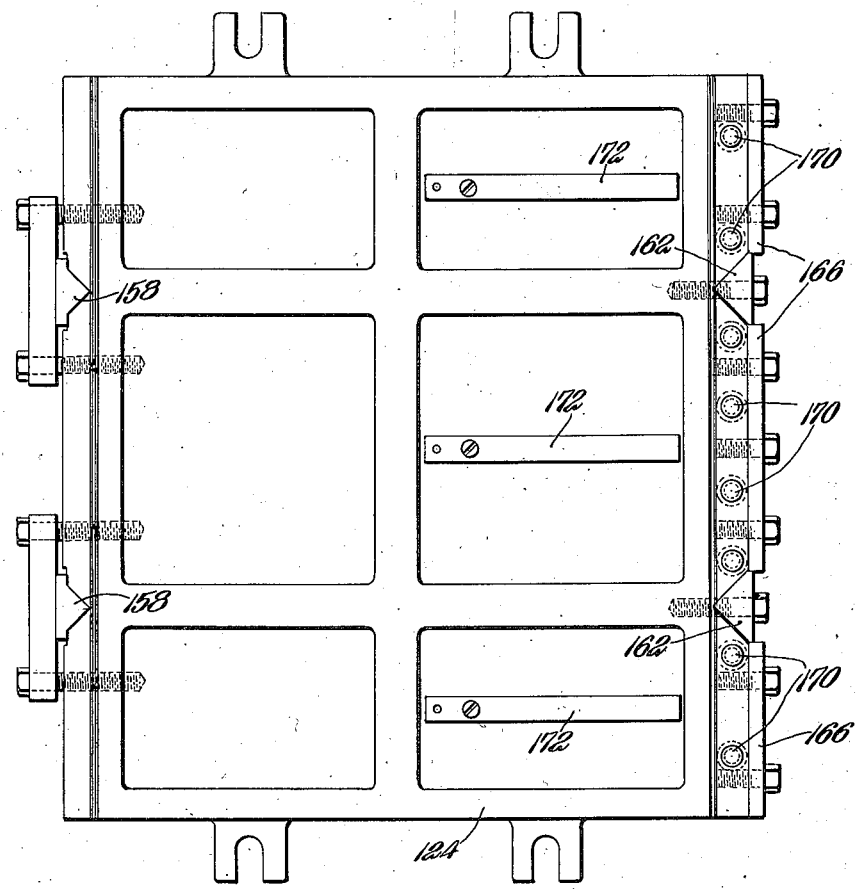
Figure 19:
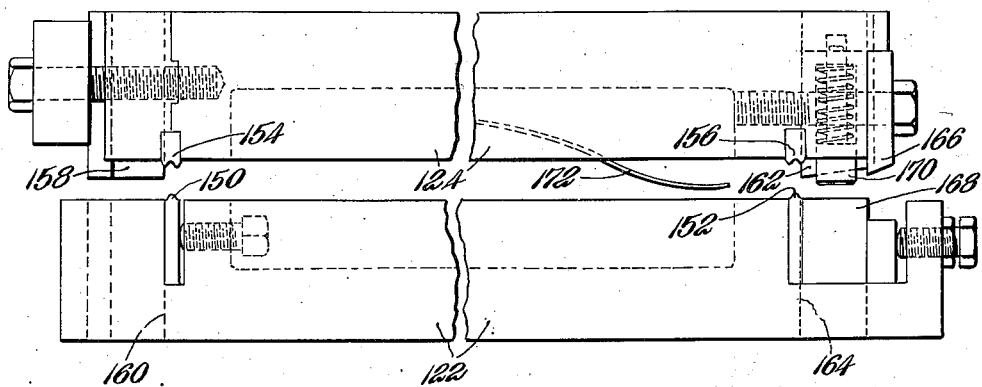

In the drawings illustrating the preferred form of the invention, Figure 1 is a plan view of the mechanism used to cover portions of the body blank with finishing material; Fig. 2 is a diagrammatic view in side elevation of the same; Fig. 3 is a plan view of the mechanism employed covering the end blank strip with finishing material; Fig. 4 is a diagrammatic view in side elevation of the mechanism shown in Fig. 3; Fig. 5 is a plan view of the main portion of the machine and into which the body blank strip and end blank strip are fed by the mechanism of Figs. 1 and 3 in the manner illustrated; Fig. 6 is a side elevation of a portion of the machine shown in Fig. 5; Fig. 7 is a rear elevation of the same; Fig. 8 is a detail in rear elevation of the box assembling mechanism; Fig. 9 is a side elevation partly in section of one of the pockets forming part of the mechanism shown in Fig. 8; Fig. 10 is a section on the line 10—10 of Fig. 8; Fig. 11 is a plan view of a portion of the mechanism shown in Fig. 8; Fig. 12 is a side elevation partly in section of one of the plunger members forming part of the mechanism shown in Fig. 8; Fig. 13 is a plan view of the mechanism shown in Fig. 12; Figs. 14 and 15 are front and side elevations, respectively, of the clutch controlling the feed of the body blank strip; Fig. 16 is a front elevation of the mechanism for intermittently rotating the spider forming part of the box assembly mechanism; Fig. 17 is a front elevation of the gearing employed in driving the various mechanism in the present machine; Fig. 18 is an inverted plan of the upper die member viewed in forming the body blank and scoring them transversely; Fig. 19 is a side elevation of the upper and lower die members; Figs. 20 and 21 are a side elevation and plan, respectively, of the mechanism utilized in feeding the body blanks after they have been formed from a blank strip; Figs. 22 and 23 are side and front elevations of the mechanism used to feed the severed end blanks to position; Figs. 24 through 28 are details of the box above referred to which illustrate the method of forming the box in the present machine, and which will be hereinafter referred to.

For purposes of illustration, all of the different features of the present invention have been shown and will be hereinafter described as embodied in an automatic machine for making the Claff paper box illustrated in the U. S. Patent to M. B. Claff No. 1,579,646, although it will be understood that viewed in their broader aspects certain features of the invention may be utilized for the production of boxes of other construction and form.

As shown in said Claff patent, and as illustrated in Figs. 24, 25 and 26 herein, the Claff box comprises a body blank forming the bottom and two sides of the box, and separate end pieces, each having the lower portions thereof adhesively secured to end tabs or flanges formed upon the bottom and sides of the box at the ends thereof. The upper portion of each end piece is folded inwardly into the interior of the box and adhesively secured to the inner face of the lower portion of the end piece and to the inner surfaces of said end flanges, thereby forming at the ends of the box, a double end wall. The outer surfaces of the sides and end walls of the box are covered with a finishing sheet, preferably affixed to the blanks from which the box has been formed, as above described. and in which the finishing material is extended over the upper edges of the sides and ends to impart a finished appearance to the box.

In general, in the illustrated machine for producing the Claff box, provision is made for forming the body blank and the end blanks from supply rolls of the cardboard or other fibrous material from which the box is to be formed. Provision is also preferably made for adhesively applying finishing sheets to the blanks while the latter are in the flat form, and for folding over the finishing sheet thus applied to finish the top edges of the sides and ends. The body and end blanks having thus been formed are in the illustrated machine positioned between a plunger member and a pocket member, by which during the operation of the machine they are assembled in box forming relation. The pocket member preferably comprises one of a series of similar members mounted upon a rotatable spider, and provision is made for completing the formation of the box while the spider is rotated to successive stations, and finally the completed box is ejected from the machine.

Referring first to Figs. 1 and 2, the cardboard strip 30 from which the body blanks are to be formed is drawn from a supply roll 32 by means of constantly driven cooperating feed rolls 34 and 36 through a straightening device indicated at 38 and through pressure rolls 40 and 42. At the same time the feed rolls 34 and 36 draw strips 44 and 46 of finishing material, which may comprise white or other colored paper for imparting a finished appearance to the box, from supply rolls 48 and 50. The strips 44, 46 pass around guide rolls 52, 54 and 56, over an adhesive applying roll 58, which coats one side of them with an adhesive, such as glue, around a guide roll 60 to a stripping device 62 which removes the excess glue or adhesive, and then around guide rolls 64 and 66 and between the pressure rolls 40 and 42 which affix the strips of paper, or other finishing material, to the cardboard strips. As shown in Fig. 1, the strips 44 and 46 are applied to the bottom of the cardboard strip 30 with their outer edges extending somewhat beyond the outer edges of the strip 30. In order to finish these outer edges of the cardboard strip, these overhanging portions of the finishing strips are engaged, after passing through the pressure rolls, first by fixed folding plates 68 and 70 which fold them upwardly at right angles and about the edges of the cardboard strip and then by folding rolls 72 and 74 which turn these upstanding folds down upon the upper face of the cardboard strip and affix them to it, in the manner illustrated.

In order to afford accurate adjustment of the speed at which the feed rolls 34 and 36 are driven, to the end that the feed rolls may be driven at the speed required to harmonize with the remaining operations of the machine, a manually variable drive is provided for them. To this end a driven vertical shaft 76 has splined to it a friction wheel 78 arranged to drive a friction disk 80 fixed to a shaft 82, the latter having fixed to it a pinion 84. This pinion 84 drives the gears 86 which are fixed to the shafts carrying the feed rolls 34 and 36. The speed at which the feed rolls are driven may be accurately adjusted by varying the position of the roll 78 on the shaft 76 by means of a hand wheel 88, thus adjusting the position at which the roll engages the friction disk 80 and varying the speed of the latter.

After passing through the feed rolls 34 and 36, the paper covered cardboard strip 30 is drawn by intermittently driven feed rolls 83 and 85 through guides 87 and two sets of creasing rolls 89 and 90, (Figs. 5 and 7) which crease the strip at the places where the folds between the sides and bottom of the box are to occur. The strips 44 and 46 of finishing material are made wide enough so that they will cover the portion of the body blank strip from which the sides of the boxes are to be formed, and extend for about one-half inch beyond the creases made by the rolls 89 and 90 onto the central portion of the body blank strip which ultimately is to form the bottom of the box.

It is desirable that the intermittently driven feed rolls 83, 85 function to feed the cardboard body blank strip 30 an amount exactly equal to the length of one of the body blanks each time they are driven, and to secure this result provision is made for driving them in a manner such that no lost motion will occur, and by mechanism which affords accurate adjustment. To this end a driven shaft 92 has secured to it a crank disk 94 in which is adjustably secured a block 96. A link 98 is pivotally secured at one end to the block 96 and on its other end has formed a rack 100 driving a pinion 102 secured to a clutch disk 104 loosely mounted on the shaft 106 to which is secured the bottom feed roll 83. Pivoted on pivots 108 spaced 90 degrees apart on the disk 104, are four sets of pawls 110 which are held by springs 112 in engagement with the teeth of a ratchet wheel 114 secured to the shaft 106. There are two pawls on each of the pivots 108 and each of the eight pawls is made of a slightly different length, and as the teeth of the ratchet wheel 114 are small this insures one of the pawls being in engagement with one of the teeth of the ratchet at any position of the disk 104 so that each time this disk 104 is fed in a clockwise direction, viewing Figs. 7 and 14, through the connections described, the ratchet wheel 114, shaft 106 and feed roll 83 will be fed through the same angle in the same direction, thus insuring a uniform feed of the feed roll 83 for any adjustment of the block 96 and one in which practically no lost motion can occur. In order that the feed roll 85 may at the same time be driven through the same angle in the opposite direction to feed the cardboard strip, the shaft 116, to which the three sections comprising the feed roll 85 are secured, is driven from the shaft 106 by gearing indicated at 118 in Fig. 5.

After passing through the feed rolls 83, 85, the cardboard body blank strip is fed through guides 120 to the top of a fixed lower die member 122, (see Figs. 7, 18 and 19). Cooperating with the lower die member 122 is an upper die member 124 mounted to move vertically on posts 126, and arranged to be moved by two eccentrics 128 secured to the driven shaft 92, and by two eccentrics 130 secured to a shaft 132 driven at the same speed as the shaft 92 by means of gears 134 and 136 on the shafts 92 and 132 and an idler gear 138 on a shaft 139. The eccentrics 128 are embraced by eccentric straps 140 formed on the lower end of links 142 and the eccentrics 130 are embraced by straps 144 on the lower end of links 146, the upper ends of the links 142 and 146 being pivotally secured at 148 to the block 149 which carries the upper die member 124.

The die members 122 and 124 are arranged not only to sever the individual blanks from the cardboard body blank strips 30, but also have provision for forming the end flanges to the sides and bottom of the body blank, and for creasing transversely the ends of the bottom portion of the blank and the ends of the side portion. As herein shown the lower die member 122 is provided with creasing members 150 and 152, and the upper die member 124 is provided with creasing members 154 and 156, see Figs. 18 and 19. At the left-hand side of the upper die member, as shown in Figs. 18 and 19, two substantially triangular cutter members 158 are shown which are arranged to cooperate with similarly shaped recesses 160 in the lower die member and operate to cut triangular shaped notches in one end of the body blank, while at the right-hand end of such parts are shown similar cutters and recesses 162 and 164 to form the notches in the other end of the blank. From this description it will be apparent that at each operation or reciprocation of the upper die member 124 a portion of the body blank strip between the die members is creased transversely in the manner described and there are cut out at each end triangular shaped notches. At the next cycle of operation, a strip is fed forward into the machine and cooperating upper and lower shear members 166 and 168 operate to sever the blank from the strip.

In order to prevent the end of the cardboard strip from sticking to the upper cutter members 162 and 166 after a blank has been severed, and thus interfering with the proper feeding of the strip, downwardly spring pressed stripper members 170 are provided in the upper die member 124. Also, the upper die member is provided with spring fingers 172 in order that the end of the strip may be threaded through the space between the die members without catching on the cutters 162 and 166 and the strippers 170.

After the body blank strip has been operated upon by the die members, provision is made for moving the blank thus formed to mechanism for assembling it with separate end blanks as will de described to form the box, and as herein shown, the creased and notched blank is fed onto a table 176 before the blank is severed from the strip, and after being severed, the blank is fed by transfer mechanism indicated generally at 174 and comprising three upper feed rolls 178, 180 and 182 cooperating with three lower feed rolls 184, 186 and 188, onto a table 190 under the plunger 192 and over a pocket 194, being positioned between guides 196 and 198 thereon, (Figs. 7, 20, 21, 22 and 23) preparatory to being assembled, as will be described, with the end blanks. The lower feed roll 184 is journalled in fixed brackets 185 and is constantly driven by means of a sprocket 200 secured to its shaft 202 which is driven by means of a chain (not shown) from a sprocket on the shaft 132. The upper feed roll 178 which cooperates with the roll 184 is pivotally secured in the outer end of an arm 204 pivoted at 206 to a bracket 208 secured to the frame. In order that the end of the cardboard strip may be readily fed onto the table 176, provision is made for raising the roll 178 when this occurs. To this end, the lower end of a link 210 is pivotally secured to the arm 204 and its upper end is pivoted to the outer end of a cam arm 212 pivoted to the frame and carrying a cam roll 214 which engages the periphery of a cam 216 secured to a rotating shaft 217 (Figs. 5, 6 and 7). A spring 218 holds the cam roll 214 in contact with the cam. The cam 216 is so shaped as to cause the roll 178 to be raised before the feed rolls 83 and 85 start to feed the cardboard strip and lowered after the blank has been severed so as to grip the blank between the rolls 178 and 184 and to start to feed it through the transfer mechanism. The lower feed rolls 186 and 188 are secured to shafts 187 and 189 which are journalled in fixed brackets 191 and 193 while the upper feed rolls 180 and 182 are pivotally mounted on the outer ends of arms 220 and 222 pivoted at their inner ends on a shaft 224 pivotally mounted in brackets 226 secured to the frame. Coil springs 228 connected between pins in the hubs of the arms 222 and the frame tend to hold the roll 182 in contact with the roll 188

In order to drive the rolls 180 and 182 to feed the blanks, the shaft 224 has secured to its outer end a sprocket 230 driven by means of a chain 231 from a sprocket (not shown) on the shaft 129. The shaft 224 also has secured to it sprockets 232 and 234 which drive sprockets 236 and 238 secured to the shafts 240 and 242 to which the rolls 180 and 182 are secured.

It may be seen from Figs. 20 and 21 that the feed rolls 182 and 188 will not feed the blanks entirely into the desired assembly position on the table 190, which is indicated by the blank 244 shown in dot and dash lines in Fig. 21. In order to feed each blank to this position, after the rolls 182 and 188 have ceased to feed it, an upwardly spring pressed pusher finger 246 pivotally mounted in the forward end of a slidable rack 248 engages the rear end of the blank and pushes it to the position shown, its forward movement being limited by stops 250 and 252 secured to the table 190. The rack 248 is mounted in slideways in the table 176 and is reciprocated at the proper time by a pinion 254 secured to a shaft 256 journalled in brackets 258 and rocked by the engagement of a vertical rack 260 with a pinion 262 also secured to the shaft 256. The rack 260 is connected by a link 264 to one end of a cam arm 266 which is pivoted on a fixed bracket 268 and which has pivoted on its other end a cam roll 270 which engages a cam groove formed in the rear face of the cam disk 216.

From the description thus far it will be observed that in the illustrated machine the body blanks having the outer surfaces of the side walls covered with finishing material are successively formed from webs withdrawn from rolls of cardboard and finishing paper; and that after each body blank has been severed from the web it is fed to a definite position upon a table 190 over one of the pockets 194. Provision is made for forming and feeding separate end blanks to a position between the table 190 and the pocket 194 so that upon the descent of a plunger the side walls of the body blank will be formed as the body blank is forced into the pocket and at the same time the end blanks will be positioned in box forming relation.

The cardboard strips 272 and 274 from which the end blanks are formed are drawn from supply rolls 276 and 278 through guides 279, and presser rolls 280 and 282 by intermittently driven feed rolls 284 and 286 (Figs. 3, 4, 5 and 6). At the same time strips 288 and 290 of finishing material are drawn from supply rolls 292 and 294 around guide rolls 296, 298 and 300, over a roll 302 for applying an adhesive, such as glue, around a guide roll 304, to a stripping device 306, which removes excess glue, around a guide roll 308 and between the presser rolls 280 and 282 beneath the cardboard strips 272 and 274 to which the finishing strips are affixed by the presser rolls.

The width of the finishing strips 288 and 290 is preferably such, and they are preferably applied to the cardboard end strips 272 and 274 in such a position, that the portions of these strips which are to form the exposed end portions of the boxes and about one-half inch of those portions which are to form the portions of the blanks to be folded down inside the box, are covered by the finishing strips. Also the finishing strips preferably overhang the inner edges of the cardboard strips about one-half inch, as indicated at 275 in Figs. 3 and 5, in order that the completed end blanks may be provided with a tab of the finishing material which may be folded down upon the ends of the bottom portion of the body blank when the box is formed.

In order that the feed rolls 284 and 286 may feed the cardboard strips a distance exactly equal to the width of one of the end blanks each time they are rotated the lower feed roll 284 is intermittently driven from a rotating shaft 310 in a manner similar to that in which the roll 83 was driven from the shaft 92, the amount of feed being made adjustable in the same manner as is that of the roll 83. To this end a crank disk 312 is secured to the shaft 310. A block 314 is adjustably secured in the crank disk 312 and is pivotally secured to the lower end of a link 316, on the upper end of which is formed a rack 318 engaging a pinion 320 secured to a clutch disk 322 loosely mounted on the shaft 324 to which the roll 284 is secured. Pivoted on the disk 322 are pawls 326 of varying lengths arranged in four sets of two each, and which pawls are held by springs in engagement with a ratchet wheel 328 fastened to the shaft 324.

After passing through the feed rolls the cardboard end strips are fed through creasing rolls 330 and 332 which crease them at the points where the folds are to occur in the blanks, and they then pass between a glue roll 334 and a guide roll 336, the glue roll coating the upper surface of the cardboard strips and the overhanging portions 275 of the finishing strips with glue. The glue or other adhesive is preferably supplied to the strips by being pumped from a supply tank 338 by a pump 340 through a pipe 342 (Fig. 5) and discharged between the glue roll 334 and a distributing roll 344 journalled in fixed brackets 346 with which the glue roll contacts.

In order that the glue roll 334 may be raised from the surface of the end blank strips when the latter are not being fed, the glue roll is journalled in arms 348 pivotally mounted on the shaft 350 which carries the distributing roll 344. The arms 348 are connected by links 352 to arms 354 secured to a rock shaft 356 journalled in a fixed bracket 358. An arm 360 is also secured to the rock shaft 356 and is connected by means of a link 362 to a cam arm 364 pivoted at one end at 366 to the frame of the machine and carrying on its other end a cam roll 368 which engages a cam 370 secured to the shaft 310. The shape of the cam 370 is such that the glue roll 334 is lowered and raised at the start and end respectively of the operation of feeding the cardboard strips. The glue roll 334 is secured to a shaft 374 to which is also secured a gear 376, (Fig. 17) arranged to drive a gear 378 secured to the shaft 350 upon which the distributing roll 344 is mounted. When the glue roll 334 is in its lower position, it is driven by a gear 382 secured to the shaft 384 to which is secured the guide roll 336. When the glue roll 334 is in its raised position the gear 376 is driven by a gear 386 secured to a driven shaft 388. In this manner both the glue roll 334 and distributing roll 344 may be driven continuously.

The connection between the arm 360 and the link 362 is made a yielding one in order to prevent injury to the parts if the teeth of the gears 376 and 386 are not in correct alinement when the former is raised. To this end the arm 360 is raised by a coiled spring 390 surrounding the upper end of the link 362 and taking between a block 392 pivoted to the arm 360 and a collar 394 secured to the link 362 while a nut 396 threaded on the link 362 on the opposite side of the block 392 lowers the arm 360.

In order that the presser rolls 280 and 282, creaser rolls 330 and 332, and guide roll 336 may be intermittently driven at the same peripheral speed as the intermittently driven feed roll 284, a gear 394 is secured to the shaft 324 to which this roll is secured. This gear drives idler gears 396 and 398 which drive gears 400 and 402 secured to the shafts 404 and 406 to which are secured the lower presser roll 280 and the lower creaser roll 330, respectively. Gears 408 and 410 secured to the shafts 412 and 414 to which the upper presser roll 282 and the upper creaser roll 332 are secured, are driven from the gears 396 and 398 respectively. The gear 402 also drives an idler gear 416 which drives the gear 382 on the shaft 384 which carries the guide roll 336.

The upper feed roll 286 is made in four sections which are secured to a shaft 418 journalled in arms 420 pivotally mounted on a fixed shaft 422. The arms 420 are parts of bell crank levers and springs 424 interposed between the other arms 426 of these bell crank levers and blocks 428 pivotally mounted on arms 430 secured to the shaft 422 urge the roll 286 towards the roll 284. The springs 424 surround rods 432 pivoted at one end to the arms 426 and having threaded on their other ends nuts 434 which engage the blocks 428 on the sides opposite the springs 424 to limit the movement of the roll 286 toward the roll 284.

After passing between the glue roll 334 and guide roll 336 the cardboard end blank strips feed onto a guide plate 436 (Figs. 6 and 22) secured to a block 438 in which is formed a recess 440 having secured therein a stationary shear member 442. The block 438 is adjustably secured to a fixed shelf 444 by means of bolts 446 passing through slots 448 in the shelf and threaded into the block. A vertically movable shear member 450 cooperates with the shear member 442 to sever the end blanks from the cardboard strips. The shear member 450 is secured to a block 452 horizontally adjustable by means of a hand screw 454 in slideways 456 formed in a second block 458 secured to the lower end of a vertical plunger 460. In order to vertically reciprocate the shear member 450 to sever the end blanks the plunger 460 is mounted in slideways 462 and is connected at its upper end by a link 464 to one end of a lever 466 whose other end is secured to a rock shaft 468 journalled in a fixed bracket 470. A cam lever 472 is also fixed at one end to the shaft 468 and carries at its other end a cam roll 474 which engages a cam path formed in a cam 476 secured to the shaft 217 (Figs. 5 and 6).

A transfer mechanism indicated generally at 478 in Fig. 6 and shown in detail in Figs. 22 and 23 is used to feed the end blanks into position over the ends of the pocket 194 shown in those figures and beneath the body blank 244 which in the operation of the illustrated machine is transferred to the table 190 at the same time. When the end blanks are severed from the strips, the transfer mechanism is in a position adjacent the shear members 442 and 450 so that the ends of the strips which are to be severed to form the end blanks rest on shelves 480 of the transfer mechanism. Just before the ends of the strips are severed to form the blanks, gripper points 482 carried on arms 484 secured to rock shafts 486 journalled in bearings 488 are brought into contact with the ends of the strips resting on the shelves 480 in order to retain the blanks on the shelves after they are cut from the strips.

The shelves 480 and the bearings 488 of the transfer mechanism are formed on carriages 490 mounted on fixed guide rails 492. Provision is made for first causing the gripper points to grip the end blanks as previously described, and then feed the carriages 490 to the right in Figs. 6 and 22, and as herein shown segmental bevel pinions 494 are secured to the ends of the shafts 486. The segmental pinions 494 mesh with bevel pinions 496 formed on the hubs of arms 498 pivotally mounted on studs 500 secured to the carriages 490. The outer ends of the arms 498 are connected by links 502 to the lower ends of levers 504 secured to a shaft 506 journaled in fixed brackets 508 and which also has secured to it a cam arm 510 on which is pivoted a cam roll 512 engaging a cam path formed in a cam 514 secured to a constantly rotating shaft 516. When the arms 504 are moved by the cam 514 to the right from the position shown in Fig. 6, the arms 500 will be moved to the right (Fig. 22) and the shaft 486 will be rotated in a clockwise direction (Fig. 23) so as to bring the gripper points to the position shown in that figure. Further movement of the arm 504 to the right will result in the carriage 490 being moved to the right along the guide rails 492 so as to transfer the end blanks to positions over the ends of the pocket 194. An end blank 518 is shown in such position over the pocket 194 in Fig. 23. It will be understood that this figure shows only one side of the transfer mechanism and that there is a similar mechanism on the other end of the pocket 194 to simultaneously feed another end blank into position over that end of the pocket.

In order that the first portion of the movement of the arms 504 and links 502 may be utilized to cause the gripper points to grip the end blanks in the manner described, each of the carriages 490 is provided with two spring pressed friction plates 520 which bear against the bottom of the guide rails 492 with enough force to hold the carriages in the position shown in Fig. 22 until the movement of the arms 500 is stopped by the engagement of the gripper points with the blanks on the shelves 480 but which do not engage the guide rails with enough force to thereafter prevent the carriages being moved along the guide rails to feed the blanks to position over the ends of the pockets.

By having the position of the block 438 adjustable on the shelf 444 and that of the block 452 adjustable in the slideways 456, as previously described, means are afforded for varying the position to which the end blanks are fed on the shelves 480 and since the feed of the transfer mechanism is uniform this insures the feeding of the blanks to correct position over the pocket.

After a body blank has been fed into position on the table 190 and two end blanks have been fed into position over the ends of the pocket indicated at 194 in the manner previously described, the block 192 descends forcing the blanks into the pocket to form the box. The block 192 is mounted on the lower end of a vertical plunger 524 mounted in slideways 526 and having pivoted to its upper end a link 528 by which it is connected to a cam arm 530, pivotally mounted on a shaft 532 secured in fixed brackets 534 and which cam arm 530 has pivoted to it a cam roll 536. The cam roll 536 engages a cam groove in a cam 538 secured to the shaft 217. A counterweight 540 is secured to the end of the cam arm 530 remote from the plunger 524, for counterbalancing.

In order that the body blanks and the block 192 which engages them may be permitted to descend into the pockets, the table 190 is made in two separated sections 542 and 544. Adjacent the inner edges of these sections of the table cylindrical rolls 546 and 548 are pivotally mounted on brackets 550 and 552 with their axes parallel. The rolls 546 and 548 are of a length slightly greater than the boxes being formed and they are mounted with their top edges on substantially the same level as the top of the table 190 so as to permit the body blanks to be readily fed onto the table and with the distance between their inner edges exactly equal to the width of the boxes being formed. As a result, when the block 192 descends, it engages the portion of the blank from which the bottom of the box is to be formed and the portions from which the sides are to be formed are engaged by the rolls 546 and 548 and turned up right angles to the bottom portion at the creases which were previously formed for this purpose. Further downward movement of the block causes the tabs formed on the bottom and side portions of the blank to be engaged by recesses 554 and 556 formed in fixed end folders 558 and 560 which fold the tabs in at right angles to the bottom and sides into the positions they occupy in the finished box.

Immediately after the body blank has been folded in the manner described, by the initial downward movement of the block 192 and upon continued downward movement of the block into the pocket, the block with the folded body blank upon it, engages the end blanks which are held in a position overhanging the ends of the pocket with their glued faces uppermost, as indicated in Fig. 23, and folds the portions extending inside the ends of the pocket down into the pocket at right angles to their original position and against the ends of the pocket and with their glued faces against the tabs or end flanges on the body blank. When the end blanks are folded down in this manner, the tabs 562 (see Fig. 25) which were formed from the overhanging portions 275 of the paper strips, engage the bottom of the pocket and are folded in at right angles across the bottom edges of the end blanks, and when the block 192 reaches the bottom of the pocket, the end portions of the bottom of the body blank engage the glued upper surface of the tabs 562 and are affixed to them.

In order to connect the block 192 to the plunger 524, the body portion 564 of the block is slidably mounted on the lower end of the plunger and has journalled in it a shaft 566 to which is secured a pawl 568 normally engaging a notch 570 in the plunger 524 (see Fig. 12). The end plates 572 and 574 of the block are secured to slides 576 and 578 respectively, mounted to slide horizontally in guideways in the body portion 564 of the block, and having pivoted at 580 and 582 at their inner ends the obliquely disposed links 584 and 586 which are also pivoted at their other ends, at 588 and 590, in recesses 592 and 594 in the lower end of the plunger 524. A bottom plate 596 is secured to the body portion 564 of the block and a coil spring 598 interposed between it and the bottom of a recess 600 in the lower end of the plunger 524 normally tends to urge the bottom plate 596 downwardly so as to pull the slides 576 and 578 and end plates 572 and 574 inwardly until the beveled lower surfaces 602 of the latter engage the beveled end faces 604 of the bottom plate 596.

When the bottom plate 596 of the block 192 reaches the bottom of a pocket and is stopped thereby, it is desired to have the plunger 524 descend further in order that the links 584 and 586 carried by it may push outwardly upon the slides 576 and 578 and end plates 572 and 574 so as to press the end blanks and the tabs on the body blank firmly against the ends of the pocket and insure the tabs adhering to the end blanks.

In order to permit the plunger 524 to continue to descend, as above described, after the block 192 has reached the bottom of a pocket, provision is made for disengaging at this time the pawl 568 carried by the block from the notch 570 in the plunger. To accomplish this, an arm 606 is secured to the shaft 566 to which is pivotally connected the lower end of a link 608, the upper end of the link passing through a hole in a shelf 610 secured to the slide 526 (Fig. 6). A nut 612 threaded on the upper end of the link 608 engages the top of the shelf 610 to rock the shaft 566 and disengage the pawl 568 from the notch 570 at the required time.

In order that the pressure applied by the plunger 524 and block 192 to the bottom and ends of the box in the pocket may be a yielding one, a yielding connection is provided between the cam arm 530 and the link 528. To this end, a coil spring 614 is provided between a shoulder 616 on the link 528 and a block 618 pivotally mounted in the forked end of the cam arm 530, and surrounding the upper portion of the link 528 on which are provided threaded nuts 620 on the side of the block 618 remote from the spring 614 in order to adjust the tension in that spring.

During the first part of the upward movement of the plunger 524 the links 584 and 586 pull inwardly on the slides 576 and 578, relieving the pressure of the end plates on the ends of the pocket and then the block 192 starts to rise with the plunger and the pawl 568 returns to engagement with the notch 570 and remains there during the rest of the upward movement.

While the end blanks are being pressed by the end plates 572, 574, the upper portions of the end blanks outside of the pocket are held by the gripper points 482 against the shelves 480 of the transfer mechanism in the position indicated at 624 in Figs. 23 and 25. After the pressing operations have been performed, however, provision is made for raising the gripper points from the blanks so as to permit the pocket carrying the partially completed box to be fed to the next station. For this purpose, the arms 504 are moved to the left, viewing Fig. 6, at this time so as to move the links 502 to the left until the arms 498 engage stops 626 fixed to the carriages 490, (Figs. 22 and 23). This movement of the arms 498 rotates the shafts 486 in a direction to disengage the gripper points from the end blanks and further movement of the arms 504 and links 502 causes the carriages 490 to be moved along the guide rails 492 to the left as seen in Fig. 22 until they reach the position shown in that figure.

In the illustrated machine the pockets 194 in which the boxes are formed are four in number and are located 90 degrees apart on the periphery of a spider 628 fixed to an intermittently rotatable shaft 629. Immediately after the gripper points have been withdrawn from the end blanks the spider is rotated 90 degrees in a manner hereafter to be described. During the first part of this movement the portions of the end blanks outside the pocket will be moved from beneath the gripper points and will tend to spring upwardly until they are in the same vertical plane (in a position indicated in dotted lines at 630 in Fig. 25), as the lower portions of the blanks which as previously described have been glued to the tabs or end flanges of the body blank. When first released, however, the upper portions of the end blanks will engage the framework 632 which supports the table 190 (Fig. 22) and will be prevented thereby from assuming a vertical position until such time as the spider has moved them past said framework. Shortly after having reached a vertical position, these upper portions of the end blanks are engaged as the spider rotates, by fixed folding plates 634 which fold them down from the position shown at 630 in Fig. 25 to that shown at 636 and retain them in this position until the pocket carrying the partially completed box arrives at a position in line with a block 638 carried on the end of a plunger 640 mounted to move horizontally in slideways 642 (Fig. 6), the upper portions of the end blanks being guided, in a position corresponding to that shown at 636 in Fig. 25, to a position inside the block 638. After the pocket has reached this second station, the block 638 is fed to the left, viewing Fig. 6, into the pocket. During this movement the block engages the free ends of the end blanks and folds them from the position shown at 636 in Fig. 25 to that shown at 644 in Fig. 26, with their glued surfaces against the inside of the tabs on the body blank and against the inside of the lower portions of the end blanks which have been previously glued to the outside of these tabs.

The block 638 is similar in construction to the block 192 and is mounted on the end of the plunger 640 in the same manner that the block 192 is mounted on the end of the plunger 524. Consequently when the block 638 reaches the bottom of the pocket, its end plates expand in the same manner as the end plates 572 and 574 of the block 192 and press the folded end blanks with the tabs of the body blank between their folds against the ends of the pocket to firmly affix the inner folds of the end blanks to the tabs of the body blank and to their own outer folds. This operation completes the formation of the box. In order that this pressure may be evenly applied over the entire area of the end blanks, the end plates of the block 638 are preferably faced with soft rubber.

In order to impart to the plunger 640 the desired movements, it has formed on it a lug 646 to which is pivoted one end of a link 648 whose other end is connected to the lower end of a cam lever 650 pivotally mounted at its upper end on a shaft 652 secured in fixed brackets 654. The cam lever 650 has pivoted on it a cam roll 656 which engages a cam path in a cam 658 secured to a constantly rotating shaft 660 (Fig. 6). The connection between the link 648 and the cam arm 650 is made a yielding one so that the pressure applied to the bottom and sides of the box may be yielding, by means of a coil spring 662 interposed between a shoulder 664 on the link 648 and a block 666 pivoted on the forked end of the cam lever 650. Nuts 668 threaded on the end of the link 648 on the side of the block 666 opposite the spring 662 regulate the tension on the spring 662.

The mechanism for intermittently rotating the shaft 629 and the spider 628 carried by it through successive intervals of 90 degrees, includes in the illustrated machine a constantly rotating shaft 669 having secured to it a driving disc 670 to which is pivoted a driving roll 672 adapted to engage one of four slots 674 formed in a Geneva wheel 676 secured to the shaft 629 (Figs. 6 and 16). The periphery of the disc 670 is adapted to engage one of four recesses 678 formed in the Geneva wheel to lock the parts in position after they have been fed. In order to aid in stopping the Geneva wheel and avoid excessive strains on the parts of the machine, a brake drum 680 is secured to the shaft 629, about which a brake band 682 is tightened when the shaft 629 is nearing the end of its feeding movement. In order to thus tighten the brake band 682, one end of it is fixed at 684 to a fixed block 686 and the other end is secured to one end of a lever 688 pivoted at 690 to the block 686. The other end of the lever is connected by means of a link 692 to one end of a cam lever 694 pivoted at 696 to the frame of the machine, and having pivoted to its other end a cam roll 698 which engages the periphery of a cam 700, secured to the shaft 660. A spring 702, connected between a pin in the cam lever 694 and one on the frame of the machine, holds the cam roll 698 against the cam 700.

After the block 638 has been withdrawn from the completed box, the pocket carrying the box is fed through two more steps of 90 degrees each, to the position indicated at 704 in Figs. 6 and 8, and which position may be regarded as the ejecting station. At this position provision is made for ejecting the box from the pocket. To this end ejector plates 706, which normally fit into recesses 708 in the bottom of the pockets 194, are secured on the outer ends of slides 710 slidably mounted in guideways 712 formed in the arms 714 of the spider 628 (Figs. 8, 9, 10 and 11). In order to normally hold the plates 706 in this position with their outer faces flush with the bottom surfaces of the pockets 194, a roll 716 is pivotally mounted on the inner end of each of the slides 710 and engages an annular slot 718 concentric with the shaft 629 formed in a fixed guide block 720 mounted on the shaft 629 between the spider 628 and the hub of the Geneva wheel 676. An arm 722 secured at one end to a lug 724 on the guide block 720 and at the other to a portion of the frame of the machine, prevents the guide block from turning with the shaft 629.

In order that each of the slides 710 may be moved outwardly in its guideways 712 when the corresponding pocket reaches the position indicated at 704 in Figs. 6 and 8 to cause the ejector plate 706 secured to the slide 710 to eject the box from the pocket, a yoke 726 is mounted to slide horizontally on the shaft 629, being guided by the engagement of abutments 728 and 730 formed on the yoke with guideways 732 and 734 formed in the guide block 720. Formed on the end of the abutment 730 is a recess 736 which forms a continuation of the concentric annular slot 718 when the parts are in the position shown in Figs. 7 and 11, but which when the yoke 726 is moved to the right from the position shown in these figures, engages the roll 716 and moves the slide 710 and ejector plate 706 to the right to eject the box from the pocket.

In order to thus move the yoke 726 to eject the boxes from the pockets, a link 738 is pivotally connected at one end to the yoke and at the other to the lower end of a cam arm 740 which is pivoted at its upper end to the shaft 652, and which has pivoted to it a cam roll 742 engaging a cam path formed in a cam 744 secured to the constantly rotating shaft 660. (Figs. 5 and 6.)

The finished boxes which are thus ejected from the successive pockets at the ejecting station drop onto a constantly driven conveyor 746 from which they drop onto another constantly driven conveyer 748 which carries them out of the machine.

While the preferred embodiment of the invention has been illustrated and described, it will be understood that the invention may be embodied in other forms within the scope of the following claims.

Having thus described the invention, what is claimed is:—

1. A box making machine having, in combination, mechanism for forming a body blank comprising the bottom portion and integral sides of the box, mechanism for forming two separate end pieces, and means for adhesively affixing the end pieces to the ends of said body blank to form the ends of the box.

2. A box making machine having, in combination, mechanism for forming a body blank comprising the bottom and integral sides of the box, mechanism for forming from a sheet supply end pieces for forming the ends of the box, means for bringing the end pieces into position opposite their respective ends of the box, and means for affixing said end pieces to the ends of said body blank and for folding the upper portion of said end pieces inwardly into the interior of the box.

3. A box making machine having, in combination, three supply rolls, means for withdrawing a web from each of said supply rolls, means operating upon one of the webs for forming a body blank, means operating upon the other web for forming separate end pieces therefrom, folding mechanism for folding portions of said body blanks to form the bottom and sides of the box, means for assembling the end pieces with relation to said folded sides and bottom portion, and means for affixing said end pieces to form the ends of the box.

4. In a box making machine of the character described, in combination, means for forming and feeding a body blank into assembly position, means for forming and feeding separate end pieces into assembly position with portions of said end pieces extended under the ends of said body blank, a pocket beneath said blanks and a reciprocal plunger above said blank adapted to engage said body blank and force it with said end blanks into said pocket.

5. In a box making machine, in combination, means for forming and feeding a blank into the machine, means for folding opposite portions of the blank to form opposed upright walls and an intermediate bottom portion, means for forming and feeding separate wall blanks into the machine, and means for applying said wall blanks to form the remaining opposed walls of the box and affixing the same to the bottom portion and the first mentioned walls.

6. In a box making machine, in combination, means for producing box blanks having a finishing sheet applied to one surface thereof, means for folding the blank to form a bottom and two opposed walls of the box, and means for applying separate blanks to form the two remaining walls of the box and for affixing the same to the bottom and first mentioned walls.

7. In a box making machine, in combination, means for feeding a plurality of webs into the machine, means for forming separate individual blanks from each web, means for feeding the blanks thus formed and assembling a plurality thereof in box forming relation, and means for securing together the blanks thus assembled to form the box.

8. In a box making machine, in combination, means for feeding a body blank and separate end pieces into the machine, means for applying adhesive to the end blanks, means for assembling said blanks in box forming relation and for affixing the end blanks to the body blank.

9. In a box making machine, means for feeding a body blank, and separate end pieces into the machine, means for adhesively affixing the lower portion of the end blanks to the ends of said body blank, means for folding over the upper portion of said end blanks into the interior of the box, and means for adhesively affixing said folded upper portion to the lower portion.

10. In a box making machine, in combination, means for feeding a plurality of separate strips of fibrous material into the machine, means for forming a plurality of blanks from said strips, means for assembling the blanks thus formed in box forming relation with an end blank at each end of the box, means for securing together the assembled blanks to form the box, and means for discharging the completed box from the machine.

11. In a box making machine, in combination, means for feeding a plurality of separate blanks into the machine, means for assembling the blanks in box forming relation with an end blank at each end of the box, including a holding device, means for intermittently moving said holding device through a plurality of stations, and instrumentalities for operating on the blanks to form the box at a plurality of such stations.

12. In a box making machine, in combination, means for feeding a plurality of separate blanks into the machine, means for assembling the blanks in box forming relation with an end blank at each end of the box, including a spider rotatable through a plurality of stations and blank holding devices mounted on the spider, means for securing together the assembled blanks to form the box at certain of the stations, and means for ejecting the formed box at another of said stations.

13. In a box making machine, in combination, a rotatable member provided with a plurality of box receiving pockets, means for intermittently rotating the spider, means for feeding a plurality of blanks into a position adjacent the mouth of one of the pockets, means for introducing the blanks thus positioned into the pocket, and folding instrumentalities for operating on a blank during the rotation of the spider.

14. In a box making machine, in combination, a rotatable member provided with a plurality of box holding devices, means for feeding a plurality of blanks into a position adjacent the mouth of one of the box holding devices, and a member insertable into said box holding device for moving the assembled blanks into said device to partially form the box, means for rotating the member after the box has been partially formed, and means for completing the formation of the box after the box holding device has been rotated from said initial position.

15. In a box making machine, in combination, means for applying a finishing sheet to each of a plurality of blanks, means for assembling and securing together said blanks to form the box, including a rotatable member provided with a plurality of holding devices, means for intermittently rotating said member through a plurality of stations, means for partially forming the box at one of the stations, and for completing the formation of the box at another station.

16. In a box making machine, in combination, means for applying a finishing sheet to each of a plurality of blanks, means for feeding successive blanks into the machine, and means for forming the box in a plurality of stages, said means operating to complete one box while a succeeding box is being partially formed.

17. In a box making machine, in combination, means for feeding a body blank and two separate end blanks into the machine, and means for forming therefrom the box in a plurality of stages, said means operating to complete one box while a succeeding box is being partially formed.

18. In a box making machine, in combination, means for operating upon a plurality of webs to form a plurality of blanks for forming the bottom, sides and ends of the box, and means for assembling a plurality of the blanks thus formed and securing them together to form the box, including an intermittently moving holding device, means for partially forming the box in one position of the device, and other means for completing the box in another position of the device.

19. In a box making machine, in combination, a box forming pocket, a plunger member, means for relatively moving said pocket and plunger member, and means for conveying a body blank for forming the sides and bottom of the box and separate end forming members to between the pocket and plunger.

20. In a box making machine, in combination, a box forming pocket, a plunger member, means for relatively moving said pocket and plunger member, and means for conveying a body blank for forming the sides and bottom of the box and separate end forming members to between the pocket and plunger, said means including feeding devices operating in one direction to feed the body blank into assembly position, and other feeding devices operating in a direction at substantially right angles to the aforesaid direction for feeding said separate end members into assembly position.

21. In a box making machine, in combination, a box forming pocket, a plunger member, means for relatively moving said pocket and plunger member, and means for assembling a body blank for forming the sides and bottom of the box and separate end forming members to between the pocket and plunger, said means including means for withdrawing a strip from a supply roll and feeding the strip in a substantially straight line, means for forming and severing from the strip a body blank for forming the sides and bottom of the box, means for withdrawing separate strips from separate supply rolls and feeding said strips in a direction at substantially right angles to the feed of said body blank strip, and means for severing individual end forming members from said strips and for conveying them to a position between said box forming pocket and the body blank.

22. In a box making machine, in combination, means for withdrawing a strip from a supply roll, means for applying a finishing sheet thereto, means for forming a body blank from the strip thus covered, means for applying finishing sheets to each of two end forming strips, means for forming separate end blanks from said end forming strips, and means for assembling said body blank and separate end blanks in box forming relation and for securing the same together to form the box.

23. In a box making machine, in combination, means for withdrawing a strip from a supply roll, means for applying a finishing sheet thereto, means for forming a body blank from the strip thus covered, means for applying finishing sheets to each of two end forming strips, means for forming separate end blanks from said end forming strips, and means for assembling said body blank and separate end blanks in box forming relation and for securing the same together to form the box, said means including an intermittently rotatable member provided with a plurality of pockets, means for forcing the body blank into the pocket at one station, and means for completely affixing the end blanks to the formed body blank, during the movement of the rotatable member from said station.

24. In a box making machine, in combination, a rotatable spider provided with a plurality of pockets, a plunger movable into and from the pocket in one position of the spider, blank feeding devices for superposing a body blank upon the lower portion of separate end members, and arranging both over the pocket and between it and the plunger, means for moving the plunger to force the blanks into the pocket.

25. In a box making machine, in combination, a rotatable spider provided with a plurality of box holding pockets, means for intermittently rotating the spider, blank feeding mechanism, means for assembling the blanks in one of the pockets and for completing the formation of the box before completion of a cycle of rotation of the spider, and means for ejecting the completed box from said pocket.

26. In a box making machine, in combination, mechanism for assembling a plurality of box blanks in box forming relation, means for moving successive sets of the box blanks thus assembled through a plurality of stations, including an ejecting station, means for operating on the assembled blanks to complete the formation of the box prior to its arrival at the ejecting station, and means for ejecting the box from the machine.

27. In a box making machine, in combination, automatic blank feeding mechanism, means for assembling a plurality of the blanks thus fed in box forming relation and for securing together the assembled blanks to form the box, said means including a rotatable device having provision for holding in assembled relation a plurality of sets of blanks and spaced apart instrumentalities for operating on successive sets of the blanks presented thereto upon rotation of said device.

28. In a box making machine, in combination, automatic blank feeding mechanism, means for assembling a plurality of blanks in box forming relation and for securing together the assembled blanks to form the box, said means including a rotatable member provided with a plurality of holding devices, and means operating at one station for adhesively affixing the lower portion of an end blank to each end of a body blank held by said holding devices, means for folding the upper portion of said end blanks over and into the interior of the box during the rotation of said holding device, and means for ejecting the box from said device after the device has been rotated to a different station.

29. In a box making machine, in combination, means for feeding a body blank and two separate end blanks and box forming mechanism for forming the box from such blanks, having provision for initiating the formation of one box while a preceding box is being ejected from the machine.

30. In a box making machine, in combination, means for feeding a body blank and two separate end blanks, and box forming mechanism for forming the box from such blank having provision for simultaneously operating upon a plurality of sets of blanks to form successive boxes.

31. In a box making machine, in combination, mechanism for feeding the body and end blanks, a box shaped pocket, and a plunger insertable into the pocket to force the blanks therein, said plunger having provision for pressing the end blanks and body blanks together.

32. In a box making machine, in combination, blank feeding devices, a box shaped pocket, means for introducing a plurality of blanks into the pocket, and means for pressing together said blanks after they have been introduced into the pocket.

33. In a box making machine, in combination, a spider provided with a plurality of pockets, blank feeding devices, and means for assembling the blanks in a pocket, and for operating on the blanks while in the pocket to complete the formation of the box, said means including a plunger insertable into the pocket at one station in the rotation of said spider, a second plunger insertable into the pocket at another station, and folding devices for operating on the end blanks during the rotation of the pocket between said stations.

34. A box making machine having, in combination, means for forming a body blank, means for forming two sides of the box, means for forming two separate end pieces, and means for affixing the end pieces to the ends of the sides and bottom to thereby form the ends of the box.

35. A box making machine having, in combination, means for forming and creasing a body blank, means for forming and creasing separate end pieces, means for shaping the body blank to form the sides and bottom of the box, and means for affixing the end pieces to the ends of said shaped body blank.

36. In a box making machine, in combination, means for feeding into the machine a body blank provided with bottom and side forming portions, means for feeding separate end pieces into the machine, and means for attaching the end pieces to the bottom and sides with a portion of each end piece folded over to form a double wall.

37. In a box making machine, in combination, means for feeding into the machine a body blank, means for assembling separate ends, each of a double wall construction, in box forming relation with respect to said body portion, and means for securing said ends to the body portion to form the ends of the box.

38. In a box making machine, in combination, means for feeding into the machine a body blank provided with bottom and side forming portions, and end fastening laps on each, and means for attaching double wall end pieces to the opposite surfaces of said end fastening laps.

39. In a box making machine, in combination, means for feeding into the machine a body blank provided with bottom and side forming portions, means for adhesively affixing double wall end pieces to said body blank and for adhesively attaching together the walls of each end piece.

40. A box making machine having, in combination, means for feeding a body blank and separate end members into the machine, means for creasing the body blank to define lines of fold therein, means for shaping the body blank to form the sides and bottom of the box, and means for affixing the end members to the ends of the shaped body blank.

41. A box making machine having, in combination, means for assembling a body blank and separate end members, each having a finishing sheet applied to one surface thereof, in box forming relation, and means for folding each end member finishing sheet upon and affixing it to the bottom of the box.

MARK B. CLAFF.
WILLIAM A. JOPLIN.